US008042642B2

(12) United States Patent
Marsh et al.

(10) Patent No.: US 8,042,642 B2
(45) Date of Patent: Oct. 25, 2011

(54) MOTOR VEHICLE WITH DISCONNECTABLE ALL-WHEEL DRIVE SYSTEM

(75) Inventors: Gregory Alan Marsh, Ferndale, MI (US); James Preston Downs, South Lyon, MI (US); Richard Stephen Silbert, Commerce Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 230 days.

(21) Appl. No.: 12/537,394

(22) Filed: Aug. 7, 2009

(65) Prior Publication Data

US 2010/0044138 A1    Feb. 25, 2010

Related U.S. Application Data

(63) Continuation-in-part of application No. 12/191,699, filed on Aug. 14, 2008.

(51) Int. Cl.
*B60K 17/344* (2006.01)
(52) U.S. Cl. ........................................................ 180/247
(58) Field of Classification Search .................. 180/233, 180/247
See application file for complete search history.

(56) References Cited

U.S. PATENT DOCUMENTS

| | | |
|---|---|---|
| 4,915,190 A | 4/1990 | Iwata |
| 5,105,901 A | 4/1992 | Watanabe et al. |
| 5,105,902 A | 4/1992 | Wilson et al. |

(Continued)

FOREIGN PATENT DOCUMENTS

KR    2019990020807 U    6/1999

(Continued)

OTHER PUBLICATIONS

International Preliminary Report on Patentability (Chapter I of the Patent Cooperation Treaty) for PCT/US2009/053514, issued Feb. 15, 2011.

(Continued)

*Primary Examiner* — Kevin Hurley
(74) *Attorney, Agent, or Firm* — Harness, Dickey & Pierce, P.L.C.

(57) ABSTRACT

A vehicle with a primary driveline that is configured to distribute rotary power to a first set of vehicle wheels, a power transmitting device and a secondary driveline that is configured to distribute power to a second set of vehicle wheels. The power transmitting device has an input member, which is driven by the primary driveline, and an output member that is selectively coupled to the input member to receive rotary power therefrom. The secondary driveline has a propshaft, an axle input, a pair of axle shafts and at least one torque transfer device. The propshaft transmits rotary power between the output member of the power transmitting device and the axle input. The axle shafts are rotatably coupled to an output of the differential and configured to transmit rotary power to the second set of vehicle wheels. The at least one torque transfer device is configured to selectively inhibit torque transmission between the axle input and the second set of vehicle wheels.

17 Claims, 10 Drawing Sheets

U.S. PATENT DOCUMENTS

| | | | |
|---|---|---|---|
| 5,411,110 A | 5/1995 | Wilson et al. | |
| 5,562,566 A * | 10/1996 | Yang | 477/3 |
| 5,951,428 A | 9/1999 | Itoh et al. | |
| 6,113,512 A | 9/2000 | Williams | |
| 6,263,995 B1 | 7/2001 | Watson et al. | |
| 6,805,653 B2 | 10/2004 | Krzesicki et al. | |
| 6,814,682 B2 | 11/2004 | Spitale | |
| 6,974,400 B2 | 12/2005 | Williams | |
| 7,150,694 B2 | 12/2006 | Mizon et al. | |
| 7,331,896 B1 | 2/2008 | Kroppe | |
| 7,533,754 B2 * | 5/2009 | Burrows et al. | 180/248 |
| 2005/0023063 A1 | 2/2005 | Mueller | |
| 2006/0283654 A1 | 12/2006 | Krisher | |

FOREIGN PATENT DOCUMENTS

| | | |
|---|---|---|
| KR | 100274035 B1 | 12/2000 |
| KR | 100483163 B1 | 4/2005 |

OTHER PUBLICATIONS

International Search Report and Written Opinion for International Application No. PCT/US2010/041767, dated Feb. 28, 2011.

International Search Report and Written Opinion for International Application No. PCT/US2009/053514, dated Mar. 29, 2010.

* cited by examiner

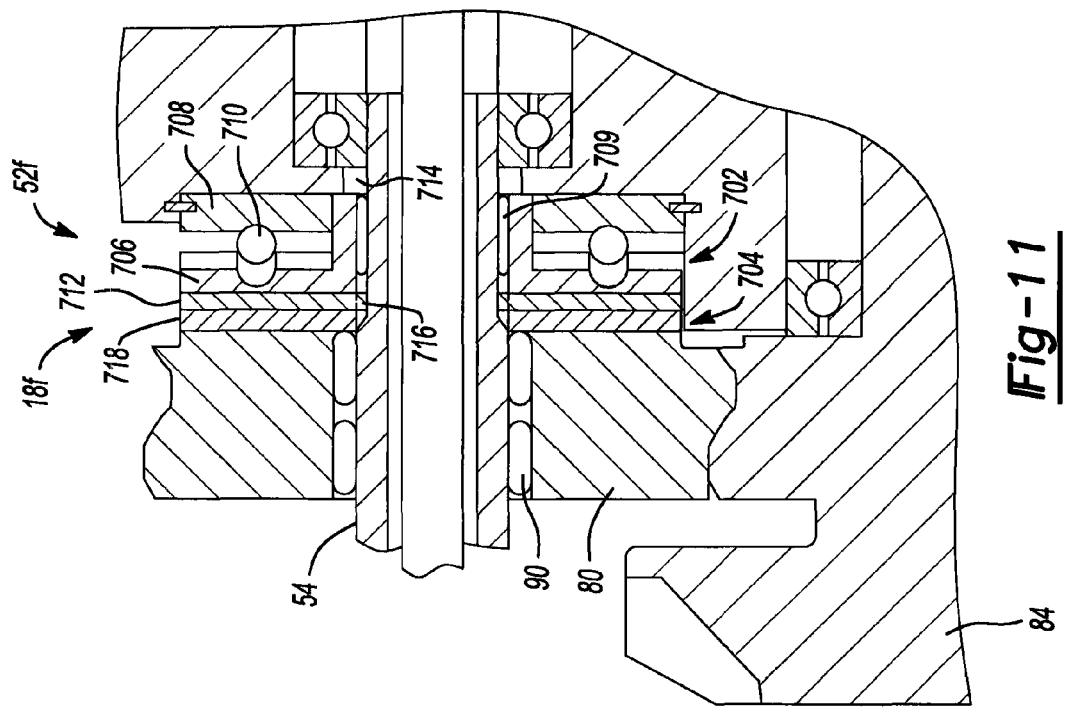
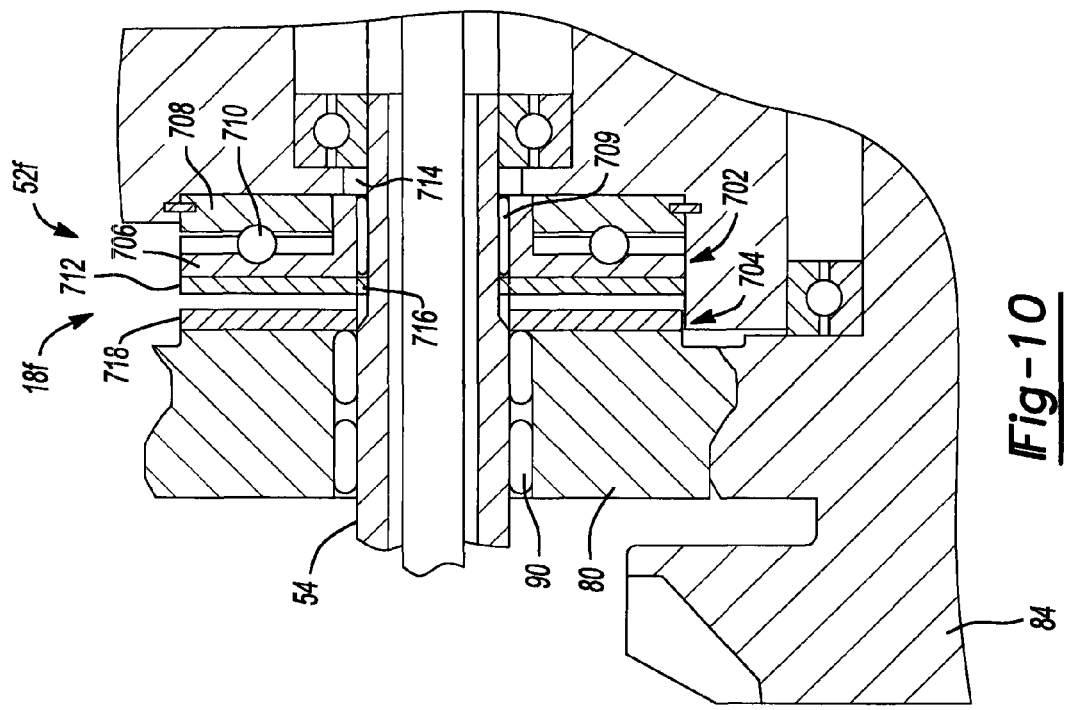

MOTOR VEHICLE WITH DISCONNECTABLE ALL-WHEEL DRIVE SYSTEM

CROSS-REFERENCE TO RELATED APPLICATIONS

This is a continuation-in-part of U.S. patent application Ser. No. 12/191,699 entitled "Motor Vehicle With Disconnectable All-Wheel Drive System" filed Aug. 14, 2008, the disclosure of which is hereby incorporated by reference as if fully set forth in detail herein.

INTRODUCTION

The present invention generally relates to vehicle drivelines and more particularly to a vehicle driveline with a disconnectable all-wheel drive system.

Many modern automotive vehicles, such as crossover vehicles, are available with an all-wheel drive (AWD) driveline that is based on a front-wheel drive (FWD) architecture. Unfortunately, such AWD drivelines typically include components, such as the output of a power take-off, that are rotatably driven even when the driveline is operated in a mode in which power is not transmitted through such components. Consequently, such AWD drivelines can be less fuel efficient (according to standards established by the U.S. Environmental Protection Agency) than similar FWD drivelines by one or two miles per gallon.

Accordingly, there remains a need in the art for an improved AWD driveline.

SUMMARY

In another form the teachings of the present disclosure provide a vehicle with a primary driveline that is configured to distribute rotary power to a first set of vehicle wheels, a power transmitting device and a secondary driveline that is configured to distribute power to a second set of vehicle wheels. The power transmitting device has an input member, which is driven by the primary driveline, and an output member that is selectively coupled to the input member to receive rotary power therefrom. The secondary driveline has a propshaft, an axle input, a pair of axle shafts and at least one torque transfer device. The propshaft transmits rotary power between the output member of the power transmitting device and the axle input. The axle shafts are rotatably coupled to an output of the differential and configured to transmit rotary power to the second set of vehicle wheels. The at least one torque transfer device is configured to selectively inhibit torque transmission between the axle input and the second set of vehicle wheels.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 10 is a section view of another power take-off unit constructed in accordance with the teachings of the present disclosure; and FIG. 11 is a view similar to that of FIG. 10 but illustrating the ball ramp clutch in an actuated condition.

DETAILED DESCRIPTION OF THE VARIOUS EMBODIMENTS

Figure 1:
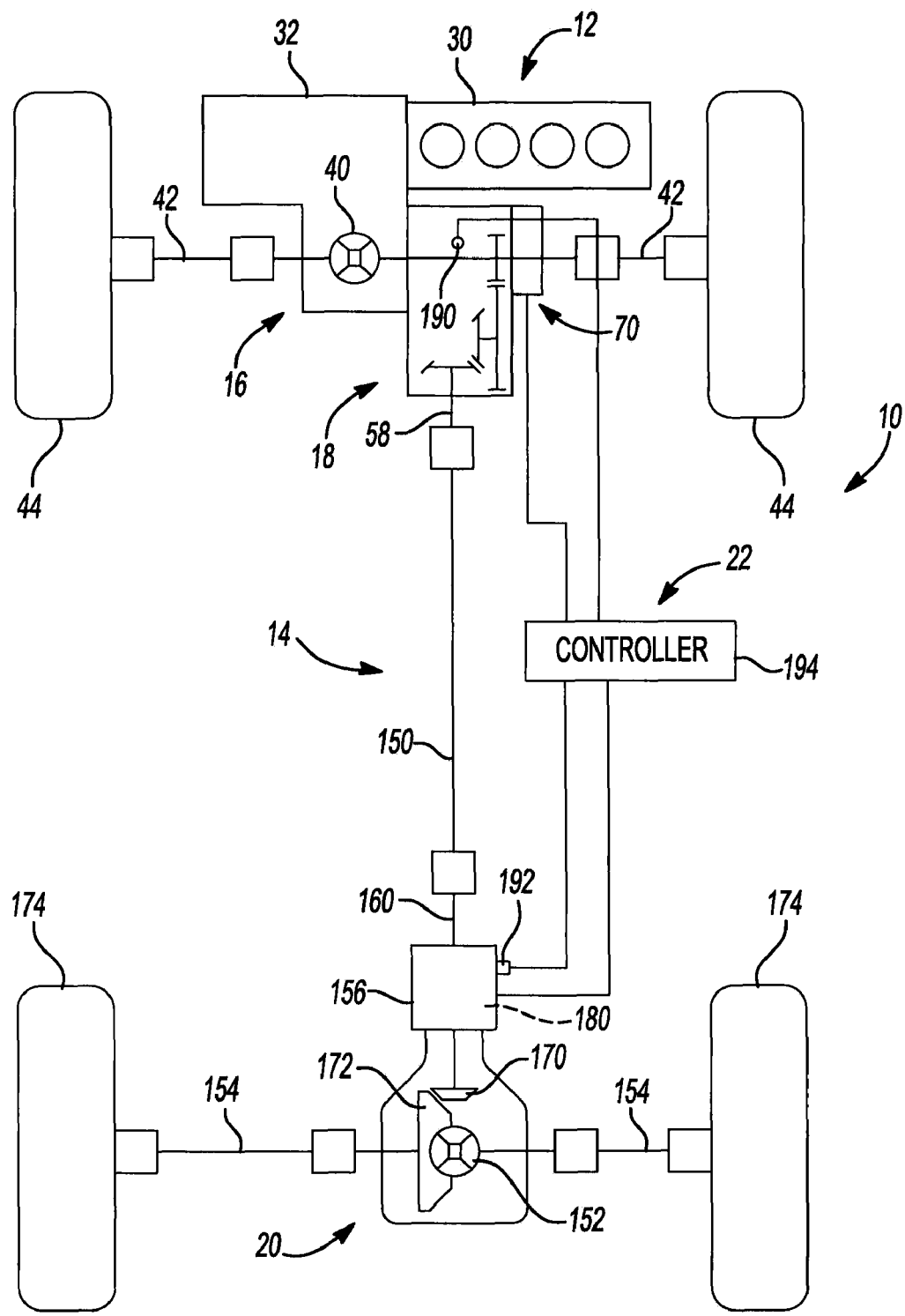
FIG. 1 is a schematic illustration of a vehicle constructed in accordance with the teachings of the present disclosure.

With reference to FIG. 1 of the drawings, a vehicle constructed in accordance with the teachings of the present invention is generally indicated by reference numeral 10. The vehicle 10 can include a powertrain 12 and a drivetrain 14 that can include a primary driveline 16, a power take-off unit (PTU) 18, a secondary driveline 20 and a control system 22.

The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which output rotary power to the primary driveline 16 and the PTU 18.

The primary driveline 16 can include a first differential 40, which can be driven by the transmission 32, and a pair of first axle shafts 42 that can couple an output (not specifically shown) of the first differential 40 to a first set of vehicle wheels 44.

Figure 2:
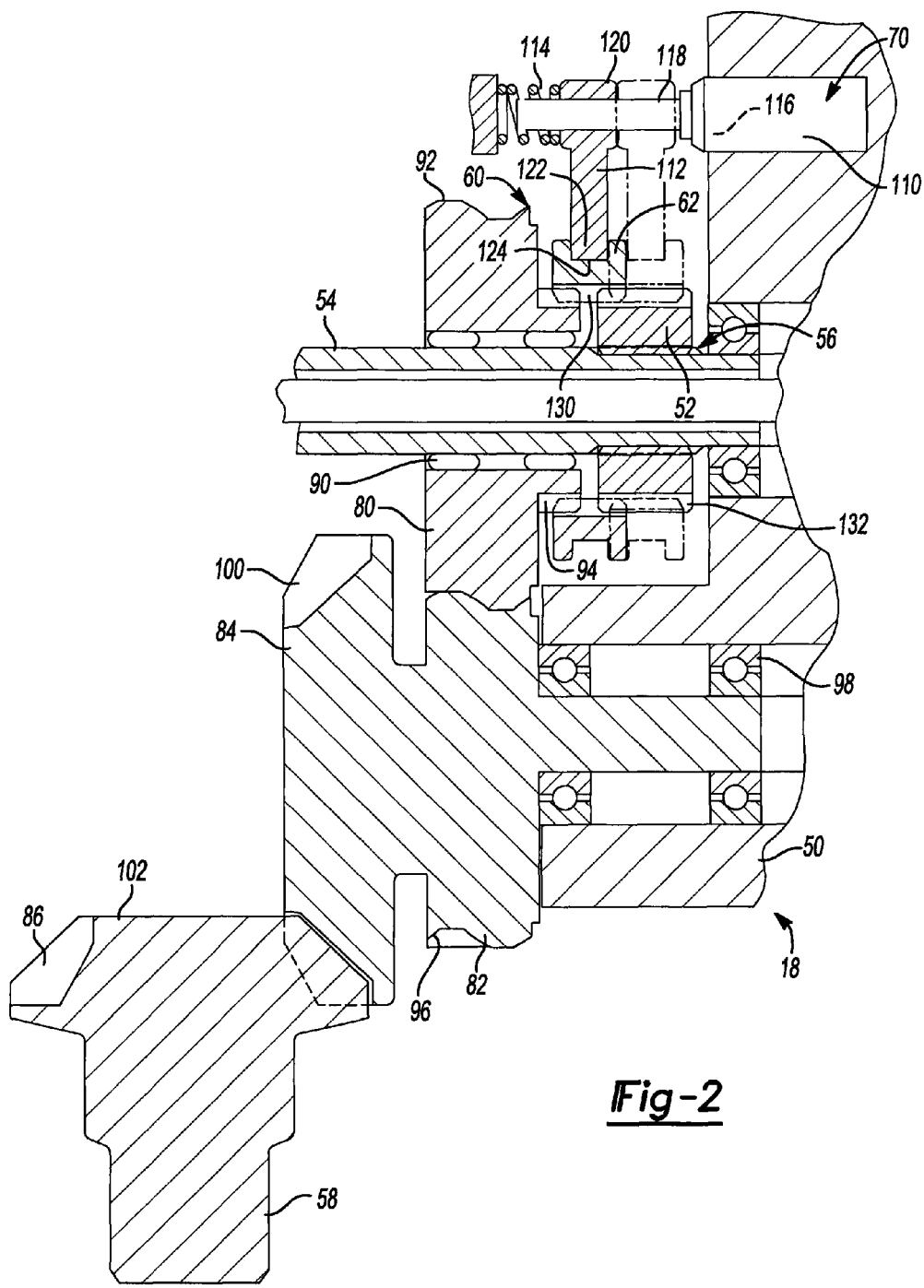
FIG. 2 is a section view of a portion of the vehicle of FIG. 1, illustrating a portion of the power take-off unit in more detail.

With additional reference to FIG. 2, the PTU 18 can include a housing 50, an input 52, which can be housed in the housing 50 and coupled for rotation with an output 54 of the transmission 32 (e.g., via a set of mating spline teeth 56), an output 58, which can be rotatably supported on a set of bearings (not shown) that are received in the housing 50, and a synchronizer 60. The synchronizer 60 can include an axially movable member 62 that can be moved between a first position (shown in phantom line in FIG. 2), in which the output 58 is not driven by the input 52, and a second position (shown in solid line in FIG. 2) in which the output 58 is driven by the input 52. The synchronizer 60 can also include an actuator, such as a linear actuator 70 for moving the axially movable member 62 from the first position to the second position, from the second position to the first position, or both.

In the example provided, the synchronizer 60 further includes an input gear 80, a driven gear 82, a first bevel gear 84 and a second bevel gear 86. The input gear 80 can be disposed coaxially on the output 54 of the transmission 32 on a set of bearings 90 and can include a plurality of gear teeth 92 and a plurality of first coupling teeth 94. The driven gear 82 can include a plurality of gear teeth 96, which can be in meshing engagement with the gear teeth 92 of the input gear 80, and can be supported via a set of bearings 98 for rotation in the housing 50. The first bevel gear 84 can be coupled for rotation with the driven gear 82 (e.g., the driven gear 82 and the first bevel gear 84 can be integrally formed as is shown in the example provided) and can include a first set of bevel gear teeth 100. The second bevel gear 86 can include a second set of bevel gear teeth 102 that can be meshingly engaged to the first set of bevel gear teeth 100. The output 58 can be coupled for rotation with the second bevel gear 86 (e.g., the second bevel gear 86 and the output 58 can be integrally formed as is shown in the example provided).

The linear actuator 70 can be any type of linear actuator and can be electrically, mechanically, hydraulically and/or pneumatically operated. In the particular example provided, the linear actuator 70 includes a solenoid 110, a shift fork 112 and a biasing spring 114. The solenoid 110 can be coupled to the housing 50 and can conventionally include a coil 116 and a plunger 118. The coil 116 can be selectively energized by the control system 22 to generate a magnetic field that can cause the plunger 118 to move from a first position (shown in phantom line in FIG. 2) to a second position (shown in solid line in FIG. 2). The shift fork 112 can include an arm 120, which can be fixedly coupled to the plunger 118, and a generally C-shaped yoke 122 that can be disposed in (and extend around a portion of the circumference of) a groove 124 that is formed about the axially movable member 62. The biasing spring 114 can be disposed between the housing 50 and the arm 120 of the shift fork 112 and can apply a force to the shift fork 112 to bias the plunger 118 toward the first position. In the particular example provided, the axially movable member 62 includes a plurality of internal teeth 130 that are meshingly engaged and slidably disposed on corresponding second coupling teeth 132 formed on the outer peripheral surface of the input 52.

When the coil 116 is energized to cause the plunger 118 to move from the first position to the second position, the shift fork 112 will move axially by a corresponding amount, causing the axially movable member 62 to slide along the second coupling teeth 132 and into engagement with the first coupling teeth 94 that are formed on the input gear 80 to thereby rotatably couple the input gear 80 with the input 52 so that drive torque may be transmitted therebetween. When the coil 116 is de-energized, the biasing spring 114 will urge the plunger 118 toward the second position and cause the shift fork 112 (and the axially movable member 62) to move axially by a corresponding amount. The axially movable member 62 will slide on the second coupling teeth 132 and will disengage the first coupling teeth 94 to thereby rotatably de-couple the input gear 80 from the input 52 so that drive torque may not be transmitted therebetween.

While the linear actuator 70 has been illustrated as including a solenoid 110 and a shift fork 112, those of ordinary skill in the art will be appreciated that various other types of devices can be employed, including ball or lead screws and pressure cylinders. Also, those of ordinary skill will appreciate that while the biasing spring 114 is configured to generate a biasing force that tends to decouple the axially movable member 62 from the input gear 80 so that the vehicle 10 is normally operated in a two-wheel drive mode (e.g., front wheel drive mode), the biasing spring 114 could be located so as to generate a biasing force that tends to couple the axially movable member 62 to the input gear 80 so that the vehicle 10 is normally operated in an all-wheel drive mode.

The secondary driveline 20 can include a propshaft 150, a second differential 152, a pair of second axle shafts 154 and at least one torque transfer device 156. A first end of the propshaft 150 can be coupled for rotation with the output 58 of the PTU 18, while a second end of the propshaft 150 can be coupled for rotation with an input 160 of the torque transfer device 156. The torque transfer device 156 can be employed to selectively transmit rotary power to an input pinion 170. Power received by the input pinion 170 is transmitted through a ring gear 172 to the second differential 152 and output from the second differential to the second axle shafts 154 to thereby couple the second differential 152 to a second set of vehicle wheels 174.

In the particular example provided, the at least one torque transfer device 156 includes a clutch 180, such as a conventional electrically-controlled friction clutch, that is disposed between the second end of the propshaft 150 and the input pinion 170 of the second differential 152. The clutch 180 can be controlled by the control system 22 to operate in a first mode, in which the second end of the propshaft 150 is rotatably de-coupled from the input pinion 170 of the second differential 152, and a second mode in which the second end of the propshaft 150 is rotatably coupled to the input pinion 170 of the second differential 152.

The control system 22 can include a first sensor 190, a second sensor 192 and a controller 194. The first sensor can be configured to sense a rotational speed of a component associated with the primary driveline 16, such as the output 54 (FIG. 2) of the transmission 32, and to responsively generate a first sensor signal in response thereto. The second sensor can be configured to sense a rotational speed of a component associated with the secondary driveline 20, such as the input 160 of the torque transfer device 156, and to responsively generate a second sensor signal in response thereto. The controller 194 can control operation of the at least one torque transfer device 156 based in part on the first and second sensor signals.

In operation, the vehicle 10 is normally operated in a two-wheel drive mode (e.g., front wheel drive mode) in which the output 58 of the PTU 18 is de-coupled from the input 52 of the PTU 18 so that substantially all of the rotary power provided from the powertrain 12 is transmitted to the first differential 40. It will be appreciated that when the vehicle 10 is operated in this mode, only the axially movable member 62 of the PTU 18 will be driven by the transmission 32. Consequently, the vehicle 10 will experience only minor losses relative to a conventional two-wheel drive vehicle (not shown) due to the additional mass of the PTU 18 and the secondary driveline 20, as well as from the rotation of the second axle shafts 154 and the second differential 152.

When all-wheel drive is desired, the control system 22 can be activated via a suitable input, which can include a manual (driver requested) input and/or an input generated by the controller 194 in response to the detection of a predetermined event (e.g., slipping of the first set of vehicle wheels 44). The controller 194 can transmit a signal to the linear actuator 70 to energize the coil 116 to cause the axially movable member 62 to be moved into engagement with the first coupling teeth 94 to thereby rotatably couple the input gear 80 to the input 52 of the PTU 18. The controller 194 can evaluate the first and second sensor signals to determine whether the rotational speed of a component associated with the secondary driveline 20 (i.e., the input 160 of the torque transfer device 156 in the example provided) is rotating at a speed that is equal to or within a predetermined tolerance of the rotational speed of the component associated with the primary driveline 16 (i.e., the output of the transmission 32 in the example provided). The controller 194 can selectively activate the torque transfer device 156 to transmit rotary power to the second set of vehicle wheels 174a when the rotational speeds of the components of the primary and secondary drivelines 16 and 20 are rotating at equal speeds or at speeds that are within the predetermined tolerance.

Figure 3:
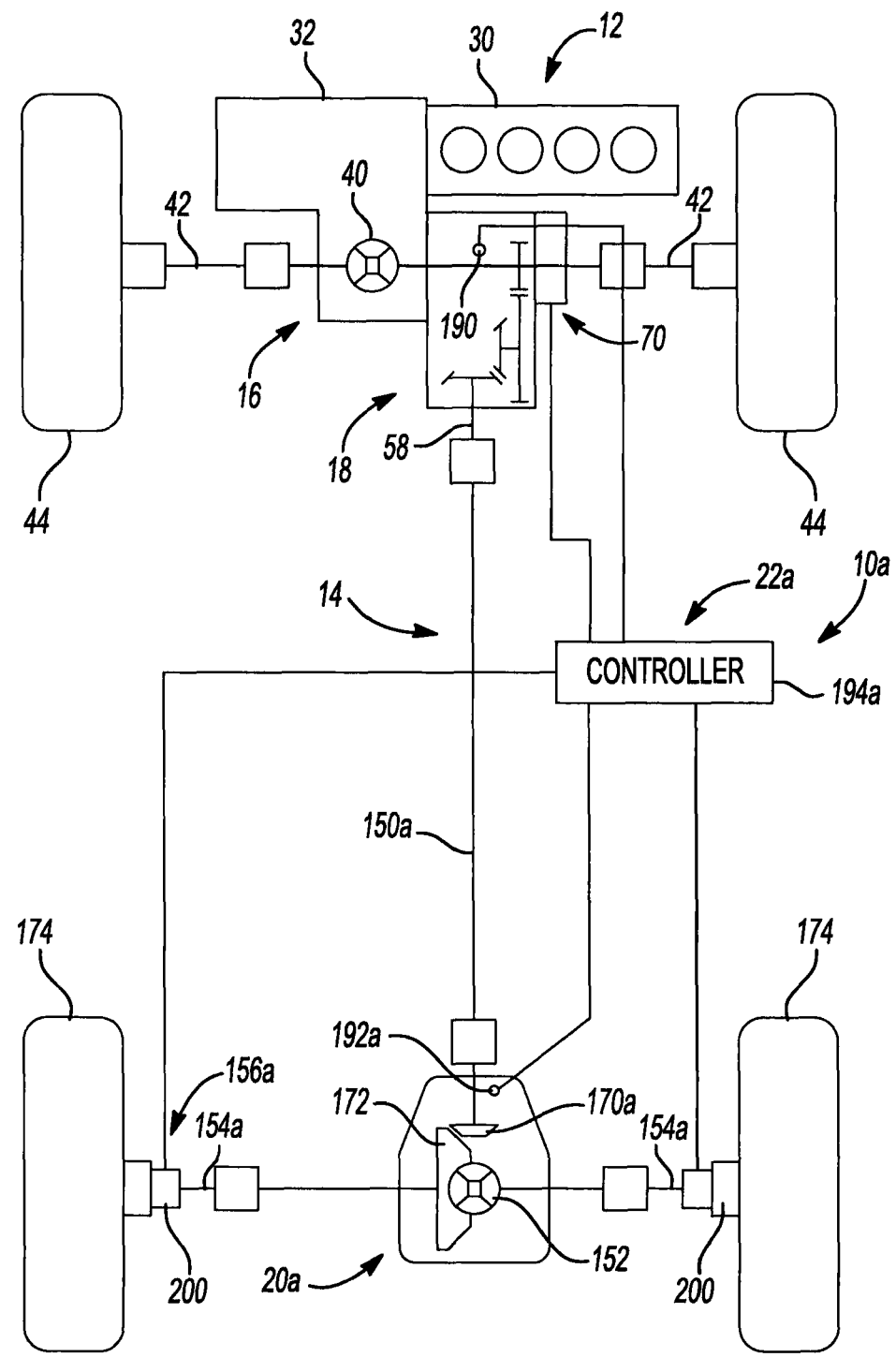
FIG. 3 is a schematic illustration of another vehicle constructed in accordance with the teachings of the present disclosure.

In the example of FIG. 3, the vehicle 10a is generally similar to the vehicle 10 of FIG. 1, except that the at least one torque transfer device 156a includes a pair of automatic wheel hubs 200 that can be operated to selectively couple the second axle shafts 154a to the second set of vehicle wheels 174, the propshaft 150a is coupled directly to the input pinion 170a of the second differential 152, and the second sensor 192a is configured to sense a rotational speed of the input pinion 170a and responsively produce a second sensor signal.

With additional reference to FIG. 2, the vehicle 10a can be normally operated in a two-wheel drive mode (e.g., front wheel drive mode) in which the output 58 of the PTU 18 is de-coupled from the input 52 of the PTU 18 so that substantially all of the rotary power provided from the powertrain 12 is transmitted to the first differential 40. It will be appreciated that when the vehicle 10a is operated in this mode, only the axially movable member 62 of the PTU 18 will be driven by the transmission 32. Moreover, rotation of the second set of vehicle wheels 174 will not cause corresponding rotation of the second differential 152. Consequently, the vehicle 10a will experience only minor losses relative to a conventional two-wheel drive vehicle (not shown) due to the additional mass of the PTU 18 and the secondary driveline 20a, as well as from the rotation of the second axle shafts 154a and the second differential 152.

When all-wheel drive is desired, the control system 22a can be activated via a suitable input, which can include a manual (driver requested) input and/or an input generated by the controller 194a in response to the detection of a predetermined event (e.g., slipping of the first set of vehicle wheels 44). The controller 194a can transmit a signal to the linear actuator 70 to energize the coil 116 to cause the axially movable member 62 to be moved into engagement with the first coupling teeth 94 to thereby rotatably couple the input gear 80 to the input 52 of the PTU 18. The controller 194a can evaluate the first and second sensor signals to determine whether the rotational speed of a component associated with the secondary driveline 20a (i.e., the input pinion 170a in the example provided) is rotating at a speed that is equal to or within a predetermined tolerance of the rotational speed of the component associated with the primary driveline 16 (i.e., the output 54 of the transmission 32 in the example provided). The controller 194 can selectively activate the at least one torque transfer device 156 (i.e., the automatic wheel hubs 200 in the example provided) to transmit rotary power to the second set of vehicle wheels 174 when the rotational speeds of the components of the primary and secondary drivelines 16 and 20a are rotating at equal speeds or at speeds that are within the predetermined tolerance.

Figure 4:
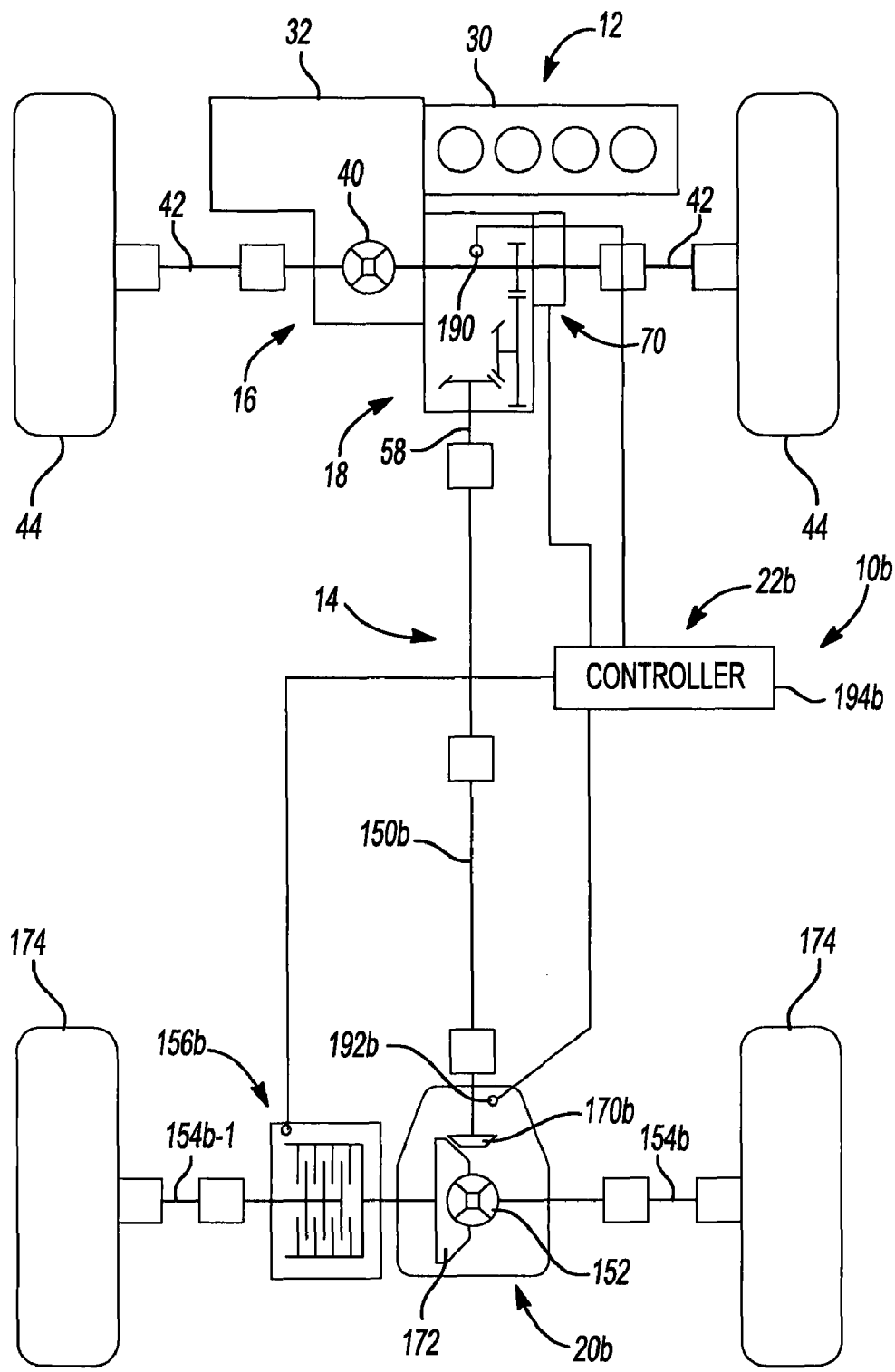
FIG. 4 is a schematic illustration of yet another vehicle constructed in accordance with the teachings of the present disclosure.
Figure 5:
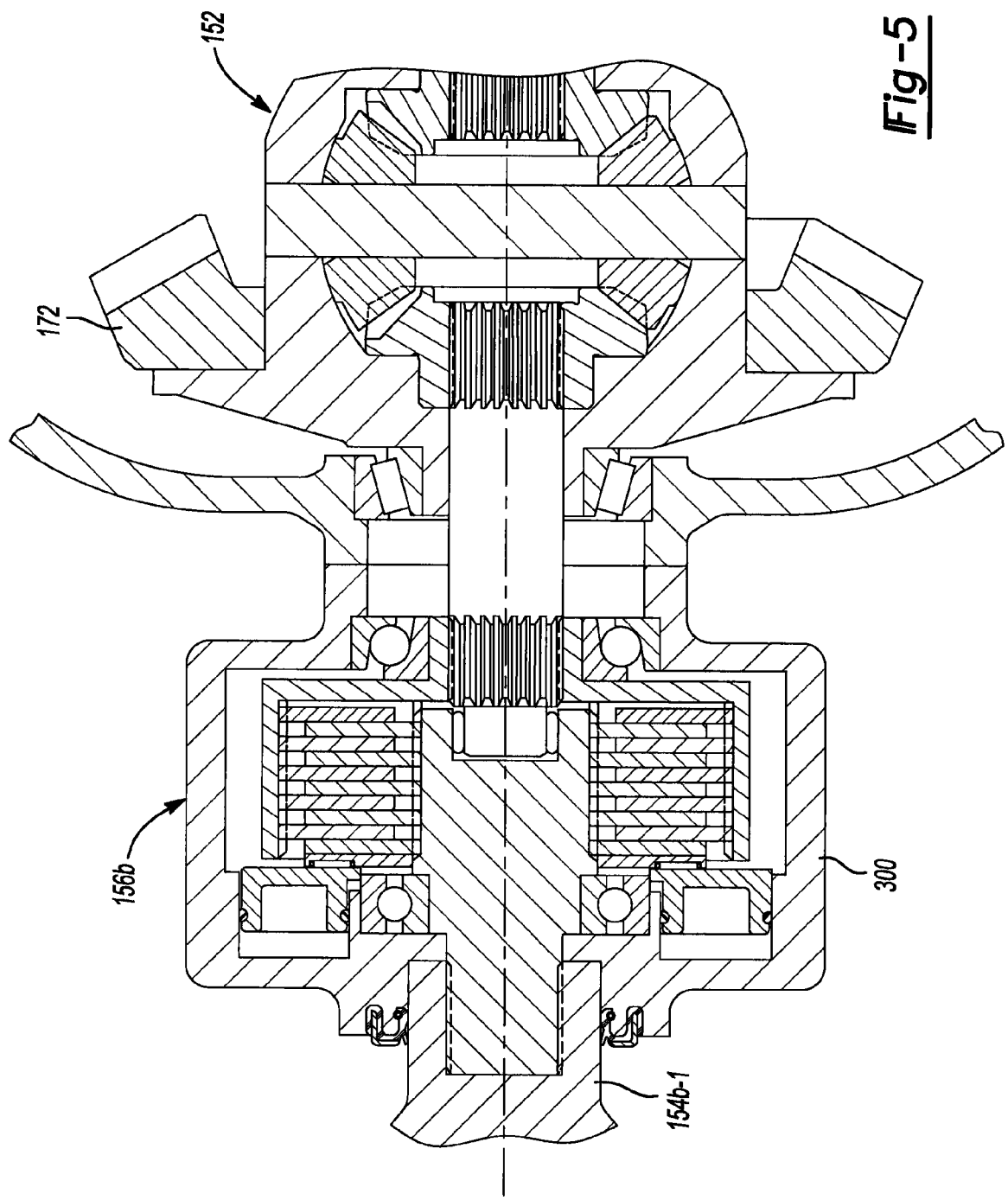
FIG. 5 is a sectional view of a portion of the vehicle of FIG. 4, illustrating a portion of the secondary driveline in more detail.

In the example of FIGS. 4 and 5, the vehicle 10b is generally similar to the vehicle 10 of FIG. 1, except that the at least one torque transfer device 156b includes a friction clutch 300 that can be operated to selectively couple a first one 154b-1 of the second axle shafts 154b to the second differential 152, the propshaft 150b is coupled directly to the input pinion 170b of the second differential 152, and the second sensor 192b is configured to sense a rotational speed of the input pinion 170b and responsively produce a second sensor signal.

With additional reference to FIG. 2, the vehicle 10b can be normally operated in a two-wheel drive mode (e.g., front wheel drive mode) in which the output 58 of the PTU 18 is de-coupled from the input 52 of the PTU 18 so that substantially all of the rotary power provided from the powertrain 12 is transmitted to the first differential 40. It will be appreciated that when the vehicle 10b is operated in this mode, only the axially movable member 62 of the PTU 18 will be driven by the transmission 32.

When all-wheel drive operation is desired, the control system 22b can be activated via a suitable input, which can include a manual (driver requested) input and/or an input generated by the controller 194b in response to the detection of a predetermined event (e.g., slipping of the first set of vehicle wheels 44). The controller 194b can transmit a signal to the linear actuator 70 to energize the coil 116 to cause the axially movable member 62 to be moved into engagement with the first coupling teeth 94 to thereby rotatably couple the input gear 80 to the input 52 of the PTU 18. The controller 194b can evaluate the first and second sensor signals to determine whether the rotational speed of a component associated with the secondary driveline 20b (i.e., the input pinion 170b in the example provided) is rotating at a speed that is equal to or within a predetermined tolerance of the rotational speed of the component associated with the primary driveline 16 (i.e., the output of the transmission 32 in the example provided). The controller 194b can selectively activate the at least one torque transfer device 156b (i.e., the friction clutch 300 in the example provided) to transmit rotary power to the second set of vehicle wheels 174 when the rotational speeds of the components of the primary and secondary drivelines 16 and 20b are rotating at equal speeds or at speeds that are within the predetermined tolerance.

Figure 6:
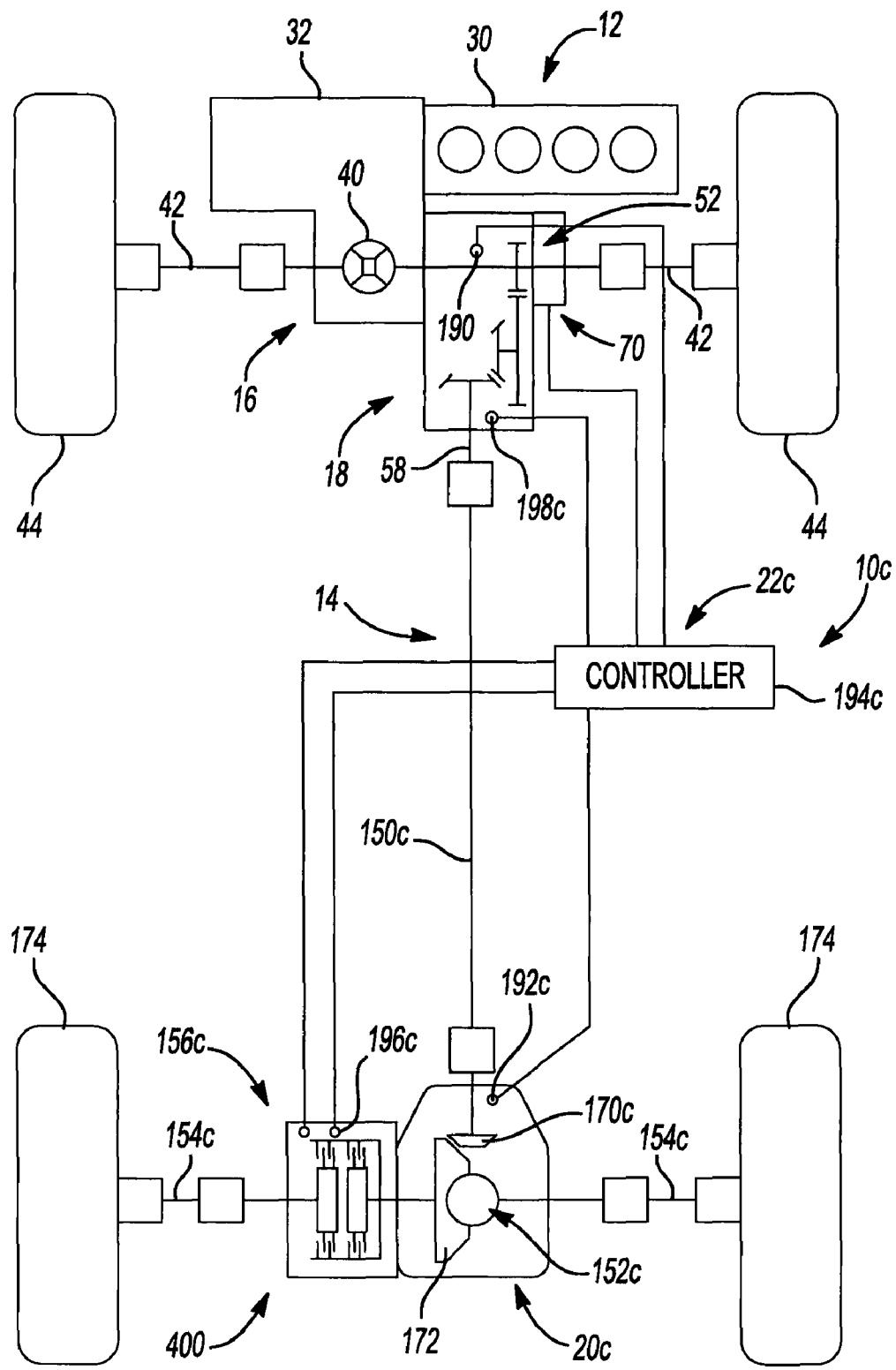
FIG. 6 is a schematic illustration of yet another vehicle constructed in accordance with the teachings of the present disclosure.
Figure 7:
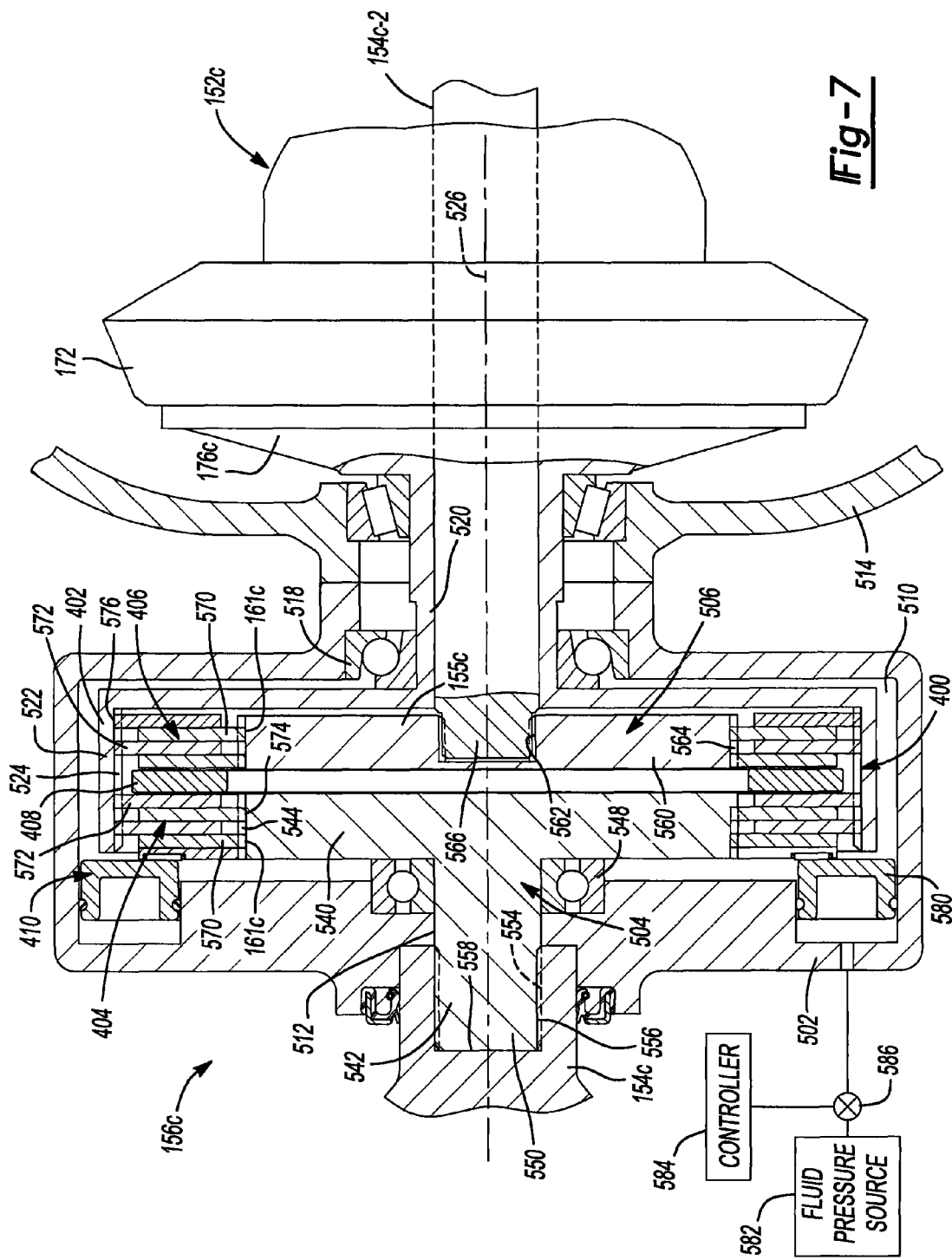
FIG. 7 is a section view of a portion of the vehicle of FIG. 6, illustrating a portion of the secondary driveline in more detail.

In the example of FIGS. 6 and 7, the vehicle 10c is generally similar to vehicle 10b of FIG. 4, except that: the second differential 152c lacks an internal gearset (i.e., pinion gears and side gears) and can consist of a differential case 176c that is coupled for rotation with the ring gear 172; the at least one torque transfer device 156c includes a friction clutch 400 that can be selectively operated to couple the second axle shafts 154c-1 and 154c-2 to the differential case 176c; the propshaft 150c is coupled directly to the input pinion 170c of the secondary driveline 20c; the second sensor 192c is configured to sense a rotational speed of the input pinion 170c and responsively produce a second sensor signal; a third sensor 196c is configured to sense a pressure in the friction clutch 400 and responsively produce a third sensor signal; and a fourth sensor 198c is configured to sense a position of the axially moveable member 62 (FIG. 2) and responsively generate a fourth sensor signal.

With specific reference to FIG. 7, the friction clutch 400 can include a clutch housing 502, a clutch input member 402, a first clutch output member 504, a second clutch output member 506, a first clutch pack 404, a second clutch pack 406, a spacer 408 and an engagement mechanism 410. The clutch housing 500 can define a cavity 510 into which the first and second clutch packs 404 and 406, the spacer 408 and the engagement mechanism 410 can be at least partly housed. A through-bore 512 can extend through the clutch housing 500. In the particular example provided, the clutch housing 500 is a discrete component, but it will be appreciated that the clutch housing 500 could alternatively be integrally formed with the housing 514 in which the differential case 176c is rotatably supported.

The clutch input member 402 can be supported for rotation within the clutch housing 500 (e.g., via a first set of bearings 518) and can be coupled for rotation with the differential case 176c. In the particular example illustrated, the clutch input member 402 comprises a shaft portion 520, which can extend through one side of the through-bore 512 in the clutch housing 502, and an annular member 522 that can be received in the clutch cavity 510 and coupled for rotation with the shaft portion 520. The annular member 522 can comprise a plurality of circumferentially spaced apart internal spline teeth 524 that can extend generally parallel to an axis 526 about which the clutch input member 402 rotates.

The first clutch output member 504 can include a first plate structure 540, which can be received in the clutch cavity 510, and a first coupling portion 542 that can be employed to couple an associated one of the second axle shafts 154c-1 to the first plate structure 540 for rotation therewith. A plurality of external spline teeth 544 can be formed about the perimeter of the first plate structure 540. The external spline teeth 544 can extend generally parallel to the rotational axis 526 of the clutch input member 402. The first coupling portion 542 can be a shaft-like structure that can be coupled for rotation with the plate structure 540. The first coupling portion 542 can be received in the through-bore 512 in the clutch housing 502 and can be supported for rotation about the axis 526 via a set of bearings 548. The first coupling portion 542 can include a coupling section 550 that can be drivingly coupled to an associated one of the second half shafts 154c-1. In the particular example, the coupling section 550 comprises a plurality of external splines 554 that are matingly engaged by a plurality of internal splines 556 formed about the perimeter of an aperture 558 in an associated one of the second half shafts 154c-1. It will be appreciated, however, that other means may be employed for coupling the plate structure 540 with an associated one of the second axle shafts 154c-1.

The second clutch output member 506 can similarly include a second plate structure 560, which can be received in the clutch cavity 510, and a second coupling portion 562 that can be employed to couple an associated one of the second axle shafts 154c-2 to the second plate structure 560 for rotation therewith. A plurality of external spline teeth 564 can be formed about the perimeter of the second plate structure 560. The external spline teeth 564 can extend generally parallel to the rotational axis 526 of the clutch input member 402. The second coupling portion 562 can be a non-circular aperture into which a matingly shaped end 566 of an associated one of the second axle shafts 154c-2 can be received. In the particular example provided, the non-circular aperture in the second coupling portion 562 and the matingly shaped end 566 of the associated one of the second axle shafts 154c-2 employ a plurality of mating splines that extend generally parallel to the rotational axis 526 to permit the associated one of the second half shafts 154c-2 to be slid into engagement with the second clutch output member 506.

The second clutch pack 406 can be generally similar to the first clutch pack 404 and as such, only the first clutch pack 404 will be discussed in detail. The first clutch pack 404 can include a plurality of first clutch plates 570 and a plurality of second clutch plates 572. The first clutch plates 570 can include a splined internal aperture 574 while the second clutch plates 572 can include a splined external perimeter 576. It will be appreciated that the configuration of the first and second clutch plates 570 and 572 could be reversed, however. The first and second clutch plates 570 and 572 can be interleaved such that each first clutch plate 570 can be adjacent to at least one of the second clutch plates 572 (i.e., adjacent to one of the second clutch plates 572 or received between a pair of the second clutch plates 572). The spacer 408 can be received between the first and second clutch packs 404 and 406.

The engagement mechanism 410 can be selectively operated to apply a force to the first and second clutch packs 404 and 406 to engage the first clutch plates 570 and the second clutch plates 572 to one another to transmit rotary power between the clutch input member 402 and the first and second clutch output members 504 and 506. The engagement mechanism 410 can include a piston 580 that can be translated via fluid pressure (e.g., hydraulic, pneumatic) from a fluid pressure source 582 to apply force to the first and second clutch packs 404, 406 (i.e., to actuate the first and second clutch packs 404, 406). Fluid pressure delivered to the piston 580 can be controlled by a controller 584 and an electronically controlled valve assembly 586 that can be configured to vary the pressure that acts on the piston 580. Alternatively, the piston 580 can be translated by an electrically-operated linear motor, such as a solenoid, to actuate the first and second clutch packs 404, 406.

To operate the vehicle 10c in a two-wheel drive mode, the friction clutch 400 can be deactivated or disengaged to decouple the clutch input member 402 from the first and second clutch output members 504 and 506 to thereby decouple the second set of vehicle wheels 174 from the second differential 152c.

If desired, the friction clutch 400 can be operated to limit the torque that is transmitted through the first and second clutch packs 404, 406. In this regard, the vehicle control system 22c can operate the engagement mechanism 410 to selectively vary an engagement force applied by the piston 580 onto the first and second clutch packs 404, 406 so as to permit the first and second clutch output members 504, 506 to slip relative to the clutch input member 402 should the torque transmitted to an associated one of the wheels of that second set of vehicle wheels 174 exceed a clutch torque produced in the respective clutch pack when a given engagement force is applied thereto.

The control system 22c can be generally similar to the control system 22 described above and illustrated in FIG. 1, except that it can further include a third sensor 196c and a fourth sensor 198c that can be coupled to the controller 194c. The third sensor 196c can be configured to sense a characteristic related to the force applied by the piston 580, such as a fluid pressure (in situations where the piston 580 is moved via a pressurized fluid), and responsively generate a third sensor signal. It will be appreciated that the third sensor signal can be employed for various reasons, including a feedback loop for controlling the engagement force, for fault detection, and/or for verification that the friction clutch 400 is engaged. The fourth sensor 198c can be configured to sense a position of a component in the PTU 18, such as the axially moveable member 62, and responsively generate a fourth sensor signal that can be employed to identify situations where the PTU 18 is or is not operating to transmit rotary power to the secondary driveline 20c.

Figure 8:
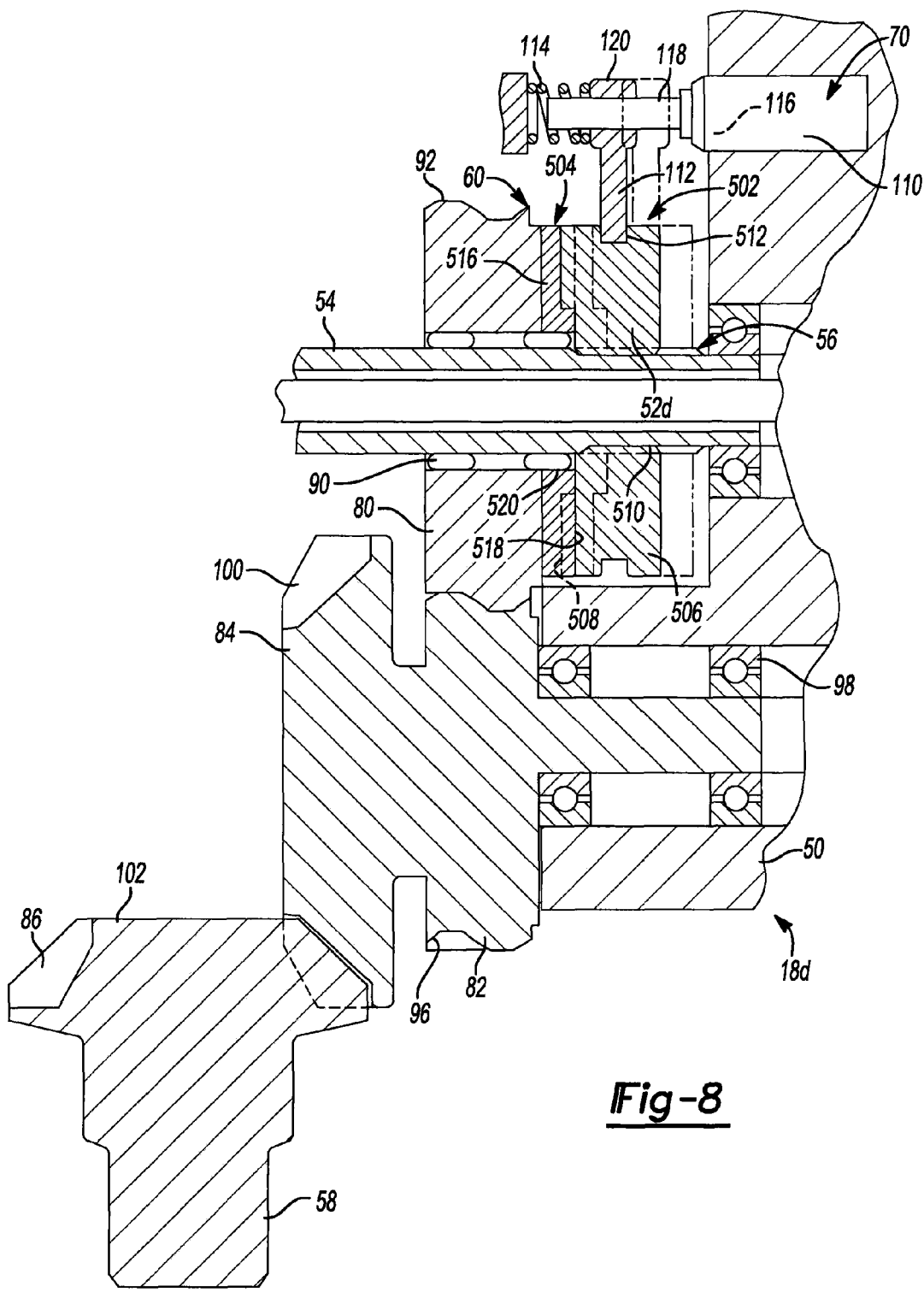
FIG. 8 is a section view of another power take-off unit constructed in accordance with the teachings of the present disclosure.

With reference to FIG. 8, another PTU constructed in accordance with the teachings of the present disclosure is generally indicated by reference numeral 18d. The PTU 18d can be generally similar to the PTU 18 of FIGS. 1 and 2, except that the PTU 18d can employ a dog clutch 52d for selectively coupling the output 54 of transmission 32 to the input gear 80. The dog clutch 52d can include a first clutch portion 502 and a second clutch portion 504. The first clutch portion 502 can include a body 506 and a plurality axially extending teeth 508. The body 506 can have a splined aperture 510 which can be coupled for rotation with the output 54, and a circumferential groove 512 that can be configured to accept the shift fork 112 of the linear actuator 70. The second clutch portion 504 can include a body 516 and a plurality of axially extending teeth 518. The body 516 can be coupled to the input gear 80 for rotation therewith and can have an aperture 520 into which one of the bearings 90 can be received. Alternatively, the body 516 and the input gear 80 can be integrally formed. The first clutch portion 502 of the dog clutch 52d can be selectively engaged with the second clutch portion 504 by the linear actuator 70. The linear actuator 70 can translate the shift fork 112, which is received in the circumferential groove 512, to axially move the first clutch portion 502 between a first position (shown in phantom line in FIG. 8), in which the teeth 508 and 518 are not engaged to one another, and a second position (shown in solid line in FIG. 8), in which the teeth 508 and 518 are engaged to one another to transmit rotary power therebetween to drive the output 58.

Figure 9:
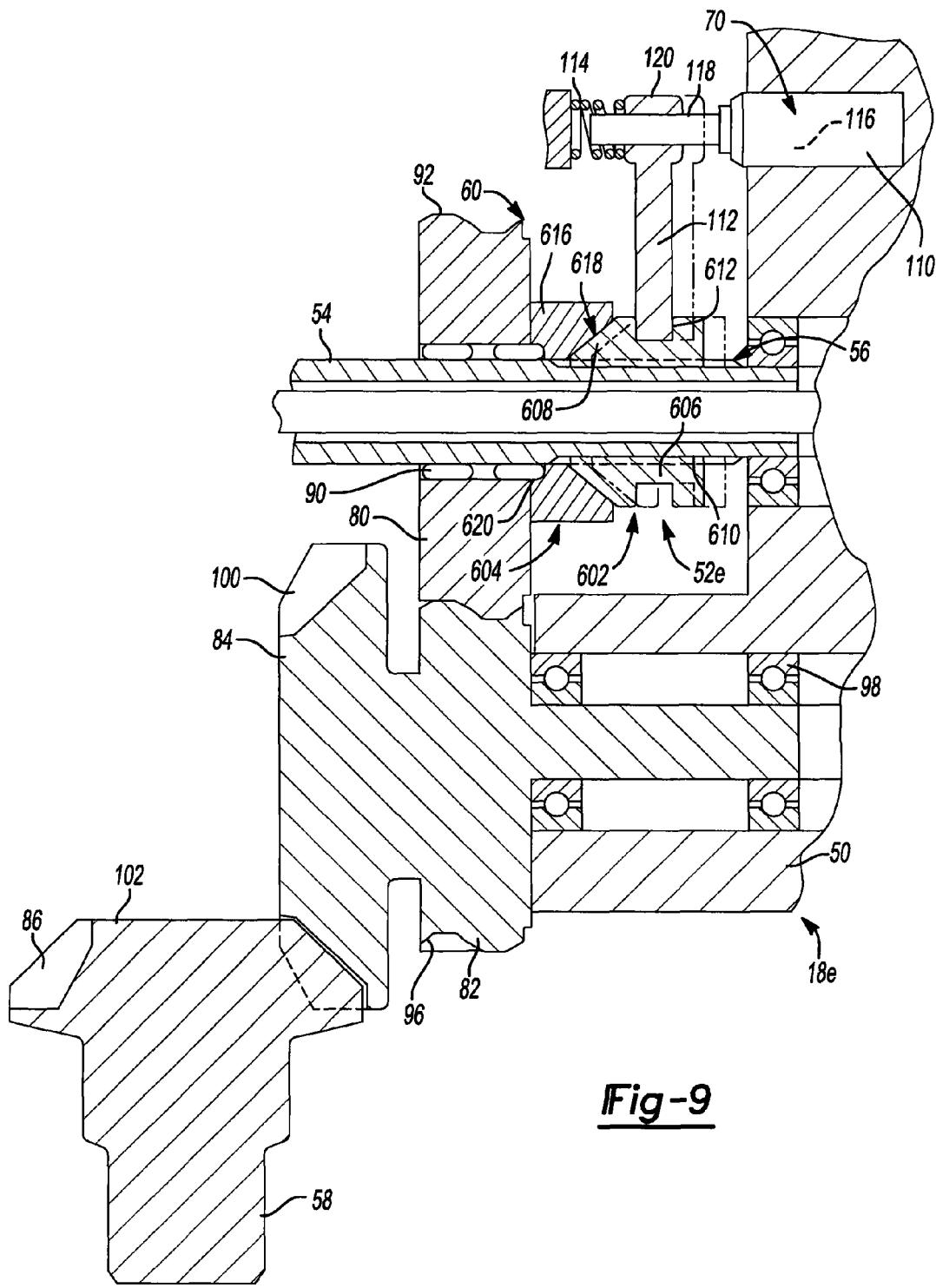
FIG. 9 is a section view of another power take-off unit constructed in accordance with the teachings of the present disclosure.

With reference to FIG. 9, another PTU constructed in accordance with the teachings of the present disclosure is generally indicated by reference numeral 18e. The PTU 18e is generally similar to the PTU 18d of FIG. 8, except that the PTU 18e can employ a cone clutch 52e for selectively coupling the output 54 of transmission 32 to the input gear 80. The cone clutch 52e can include a first clutch portion 602 and a second clutch portion 604. The first clutch portion 602 can include a body 606 and a conical projection 608. The first clutch portion 602 can have a splined aperture 610 that can be coupled for rotation with the output 54. The body 606 can have a circumferential groove 612 to accept the shift fork 112 of the linear actuator 70. The second clutch portion 604 can include a body 616 and a conical aperture 618 to accept the conical projection 608 of the first clutch portion 602. The body 616 can be coupled to the input gear 80 and can have an aperture 620 into which one of the bearings 90 can be received. Alternatively, the body 616 and the input gear 80 can be integrally formed. The first clutch portion 602 of the cone clutch 52e can be selectively engaged with the second clutch portion 604 by the linear actuator 70. The linear actuator 70 can translate the shift fork 112, which can be located in the circumferential groove 612, to axially move the first clutch portion 602 between a first position (shown in phantom line in FIG. 9), in which the conical projection 608 and the conical aperture 618 are not in contact, and a second position (shown in solid line in FIG. 9), in which the conical projection 608 is fittingly accepted by the conical aperture 618 to couple the first and second clutch portions 602, 604 to drive the output 58.

With reference to FIGS. 10 and 11, another PTU constructed in accordance with the teachings of the present disclosure is generally indicated by reference numeral 18f. The PTU 18f is generally similar to the PTU 18d of FIG. 8, except that the PTU 18f can employ a ball ramp clutch 52f for selectively coupling the output 54 of transmission 32 to the input gear 80. The ball ramp clutch 52f can generally include a first clutch portion 702 and a second clutch portion 704. The first clutch portion 702 can include an activation ring 706 and a control ring 708 with a plurality of rolling elements 710 therebetween, a first friction plate 712, and a retainer ring 714. The activation ring 706, the control ring 708, the first friction plate 712, and the retainer ring 714 can have an aperture therethrough. The activation ring 706 and the control ring 708 can be disposed coaxially on the output 54 of the transmission 32 on a set of bearings 709. The first friction plate 712 can be coupled to the output 54 by splines 716. The retainer ring 714 can maintain the alignment of the components of the first clutch portion 702. The second clutch portion 704 can include a second friction plate 718. The second friction plate 718 can be coupled to the input gear 80 or be integrally formed therewith. The first clutch portion 702 of the ball ramp clutch 52f can be selectively engaged with the second clutch portion 704 by an actuator (not shown), such as an electric coil. The actuator can operate to rotate the activation ring 706 to axially increase the distance between the activation ring 706 and the control ring 708 by the action of the rolling elements 710 rolling on ramped grooves during the rotation. As the activation ring 706 rotates (or alternatively the control ring), the rolling elements 710 roll up ramped grooves in the activation ring 706 and control ring 708 to space the rings 706, 708 apart. Axial movement of the activation ring 706 causes the activation ring 706 to push the first friction plate 712 to thereby frictionally engage the second friction plate 718 (the engaged first and second friction plates 712, 718 are illustrated in FIG. 11), thus engaging the first clutch portion 702 and the second clutch portion 704 to drive the output 58.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle comprising:
a primary driveline that is configured to distribute rotary power to a first set of vehicle wheels;
a power transmitting device having an input member and an output member, the input member being driven by the primary driveline, the output member being selectively coupled to the input member to receive rotary power therefrom; and
a secondary driveline that is configured to distribute power to a second set of vehicle wheels, the secondary driveline having a propshaft, an axle input, a differential, a pair of axle shafts and at least one torque transfer device, the propshaft transmitting rotary power between the output member of the power transmitting device and the axle input, the axle shafts being rotatably coupled to an output of the differential and configured to transmit rotary power to the second set of vehicle wheels, the at least one torque transfer device being configured to selectively inhibit torque transmission between the axle input and the second set of vehicle wheels;
wherein the power transmitting device includes a synchronizer; and wherein the synchronizer includes a collar that is mounted on a first intermediate member continuously driven by the input member, the collar being axially movable to engage a second intermediate member that is coupled for rotation with the output member.

2. The vehicle of claim 1, wherein the power transmitting device is a power take off.

3. The vehicle of claim 1, wherein the at least one torque transfer device includes a friction clutch.

4. The vehicle of claim 3, wherein the friction clutch includes a clutch member, first and second clutch packs having respective inputs driven by the clutch member and an engagement mechanism for selectively applying an engagement force to the first and second clutch packs to engage the friction clutch.

5. The vehicle of claim 4, further comprising a sensor coupled to the friction clutch, the sensor being configured to sense a characteristic indicative of the engagement force and generate a sensor signal in response thereto.

6. The vehicle of claim 1, wherein the axle input comprises an input pinion.

7. The vehicle of claim 6, wherein the secondary driveline includes a differential that is driven by the input pinion.

8. A vehicle comprising:
a primary driveline having a first differential that is configured to distribute power to a first set of vehicle wheels;
a power take-off unit (PTU) having a PTU input, a PTU output, a shift collar, an input gear, a driven gear, a first bevel gear and a second bevel gear, the PTU output being disposed perpendicular to the PTU input, the shift collar non-rotatably but axially-slidably coupled to the PTU input, the input gear being rotatably mounted on the PTU input, the driven gear being non-rotatably coupled to the first bevel gear and meshingly engaged to the input gear, the second bevel gear being coupled for rotation with the PTU output and meshingly engaged to the first bevel gear, the shift collar being movable between a first position, in which the input gear is not coupled for rotation with the PTU input, and a second position in which the input gear is coupled for rotation with the PTU input; and
a secondary driveline that is configured to distribute power to a second set of vehicle wheels, the secondary driveline having a propshaft, a second differential, a pair of half-shafts and at least one torque transfer device, the propshaft transmitting rotary power between the PTU output and an input of the second differential, the half-shafts being rotatably coupled to an output of the second differential and configured to transmit rotary power to the second set of vehicle wheels, the at least one torque transfer device being configured to selectively inhibit torque transmission through the second differential to the second set of vehicle wheels.

9. The vehicle of claim 8, further comprising a control system, the control system including a first sensor, a second sensor and a controller, the first sensor being configured to sense a rotational speed of a component associated with the primary driveline and to responsively generate a first sensor signal in response thereto, the second sensor being configured to sense a rotational speed of a component associated with the secondary driveline and to responsively generate a second sensor signal in response thereto, the controller controlling operation of the at least one torque transfer device based in part on the first and second sensor signals.

10. The vehicle of claim 9, wherein the controller is configured to operate the at least one torque transfer device when a rotational speed of the input of the second differential is equal to a speed of the PTU output when the shift collar is in the second position.

11. The vehicle of claim 9, wherein the controller is configured to operate the at least one torque transfer device when a rotational speed of the propshaft is equal to a speed of the PTU output when the shift collar is in the second position.

12. The vehicle of claim 8, wherein the at least one torque transfer device includes a clutch that couples one of the half-shafts to an output of the second differential.

13. The vehicle of claim 8, wherein the at least one torque transfer device includes a clutch that couples the propshaft to the input of the second differential.

14. The vehicle of claim 8, wherein the at least one torque transfer device includes a pair of wheel disconnecting hubs, each of the wheel disconnecting hubs being coupled to a corresponding one of the half-shafts on a side opposite the second differential, each of the wheel disconnecting hubs being operable in a first mode that is configured to transmit rotary power between the corresponding one of the half-shafts and a corresponding wheel in the second set of wheels, each of the wheel disconnecting hubs being operable in a second mode that is configured to inhibit transmission of rotary power between the corresponding one of the half-shafts and the corresponding wheel in the second set of wheels.

15. The vehicle of claim 8, wherein the PTU further includes a linear actuator coupled to the shift collar.

16. The vehicle of claim 15, wherein the linear actuator includes a shift fork that applies an axially-directed force to the shift collar to cause the shift collar to move from the first position to the second position, the second position to the first position or both.

17. The vehicle of claim 16, wherein the shift fork is received in a circumferentially extending groove formed about the shift collar.

* * * * *